United States Patent [19]

Moon

[11] Patent Number: 4,737,040
[45] Date of Patent: Apr. 12, 1988

[54] KEYBOARD DEVICE AND METHOD FOR ENTERING JAPANESE LANGUAGE TEXT UTILIZING ROMAJI CHARACTER NOTATION

[76] Inventor: Tag Y. Moon, 1050 Putney Dr., Worthington, Ohio 43085

[21] Appl. No.: 702,417

[22] Filed: Feb. 15, 1985

[51] Int. Cl.⁴ .............................................. B41J 5/10
[52] U.S. Cl. ...................................... 400/110; 178/30; 340/365 R; 400/82; 400/100; 400/486; 400/489
[58] Field of Search ............ 400/110, 82, 87, 88, 400/91, 482, 486, 489, 100, 101, 102; 178/30; 340/365 R

[56] References Cited

U.S. PATENT DOCUMENTS

| | | | |
|---|---|---|---|
| 2,196,987 | 4/1940 | Gaston | 400/82 |
| 3,305,062 | 2/1967 | Kittredge | 400/82 X |
| 4,042,777 | 8/1977 | Bequaert et al. | 400/100 X |
| 4,173,753 | 11/1979 | Chou | 400/110 X |
| 4,379,288 | 4/1983 | Leung et al. | 400/110 X |
| 4,462,703 | 7/1984 | Lee | 400/110 |
| 4,505,602 | 3/1985 | Wong | 400/110 |
| 4,531,119 | 7/1985 | Nakayama et al. | 400/110 X |

FOREIGN PATENT DOCUMENTS

| | | | |
|---|---|---|---|
| 3142138 | 5/1983 | Fed. Rep. of Germany | 400/110 |
| 58-37726 | 3/1983 | Japan | 400/110 |

OTHER PUBLICATIONS

"Automatic Mode Select on the IBM Kanji Keyboard", by Abrahamson et al, *IBM Technical Disclosure Bulletin*, vol. 26, No. 11, pp. 6112–6115, Apr. 1984.
High Technology, Jan. 1983, pp. 22–23.

*Primary Examiner*—Edgar S. Burr
*Assistant Examiner*—Moshe I. Cohen

[57] ABSTRACT

The present invention is a keyboard device for entering Japanese language text utilizing Romaji character notation and a method for entering the Romaji character notation.

5 Claims, 3 Drawing Sheets

KEYBOARD DEVICE AND METHOD FOR ENTERING JAPANESE LANGUAGE TEXT UTILIZING ROMAJI CHARACTER NOTATION

FIELD OF THE INVENTION

The present invention relates to a keyboard device and method for entering Japanese language text utilizing Romaji character notation.

More specifically the keyboard device is a first set of two keyboards capable of being activated simultaneously and comfortable to a human hand, the first keyboard of the first set in a generally horizontal position having a plurality of keys receivable to four finger digits of the human hand, the keys arranged in at least two rows, the rows containing Romaji consonants and punctuation characters and the second keyboard of the first set in a generally vertical position having a plurality of keys receivable to a thumb digit, the keys arranged in at least one row, the row containing Romaji vowels and a second set of two keyboards which is a generally mirror image of the first set of keyboards, the difference being a change in punctuation marks.

BACKGROUND OF THE INVENTION

Existing Japanese keyboards are slow, hard to use and inefficient. One keyboard, currently in use, uses the QWERTY alphanumeric type with fifty-one KANA characters arranged as a shift set. KANA, containing both KATAKANA and HIRAGANA, and KANJI are generated by specifically keyed entries aided by various keyboard controls, shifts and software used in conjunction with the keyboard.

A keyboard using a minimum number of characters, in conjunction with computer programs or software would simplify and speed the typing of Japanese.

The present keyboard device employs Romaji character notation for the entering of Japanese language text.

There are several systems of Romaji notation. The first is the Official System (according to Japanese Government Notification Number 1, dated Dec. 9, 1964). This system redefines the Roman alphabets employed as representing Japanese phonemes, regardless of their customary pronunciations in English or other European languages.

The Official System of Romaji notation with allowed exceptions is shown in Table I and Table II.

TABLE I

| OFFICIAL | | | | | | | |
|---|---|---|---|---|---|---|---|
| a | i | u | e | o | | | |
| ka | ki | ku | ke | ko | kya | kyu | kyo |
| sa | si | su | se | so | sya | syu | kyo |
| ta | ti | tu | te | to | tya | tyu | tyo |
| na | ni | nu | ne | no | nya | nyu | nyo |
| ha | hi | hu | he | ho | hya | hyu | hyo |
| ma | mi | mu | me | mo | mya | myu | myo |
| ya | (i) | yu | (e) | yo | | | |
| ra | ri | ru | re | ro | rya | ryu | ryo |
| wa | (i) | (u) | (e) | (o) | | | |
| ga | gi | gu | ge | go | gya | gyu | gyo |
| za | zi | zu | ze | zo | zya | zyu | zyo |
| da | (zi) | (zu) | de | do | (zya) | (zyu) | (zyo) |
| ba | bi | bu | be | bo | bya | byu | byo |
| pa | pi | pu | pe | po | pya | pyu | pyo |

TABLE II

| OFFICIAL EXCEPTIONS | | | |
|---|---|---|---|
| sha | shi | shu | sho |
|  |  | tsu |  |
| cha | chi | chu | cho |
|  |  | fu |  |
| ja | ji | ju | jo |
| di | du | dya | dyu | dyo |
| kwy |  |  |  |
| gwa |  |  |  |
|  |  |  | wo |

A second system, the Nippon System, resembles the Official System closely, but also incorporates traditional Japanese notation which may exist as distinct syllables, but are no longer distinctly pronounceable entities, such as wi, we, wo, kwa, or gwa, for example.

A third system, the Hepburn, was created by James Curtis Hepburn, an early missionary to Japan. This system attempts to approximate Japanese syllables by combination of Roman characters which come closest to the true Japanese pronunciation when pronounced by English-speaking people.

The present invention will follow the Official System, except for the notation of certain foreign terms.

The Japanese language has, perhaps, the most complex script in the world. It is a mixture of KANJI ideographs and KANA phonetic letters. Most documents in Japan are handwritten and often hard to read unless the writer is an accomplished calligrapher.

Keyboards with over a hundred keys exist, where each key has several characters on it. As can be imagined, the analysis and typing of the characters is cumbersome and tiresome.

In addition, while each character signifies a separate concept, many words in Japanese are compounded from at least two such concepts and thus two characters.

Compounds of two KANJI characters are often unique, while a one KANJI character may not be unique. Using a phonetic conversion system, such as Romaji and computer programs, unique KANJI pairs can often be generated.

Many KANJI characters consist of two syllables and are represented utilizing Romaji character notation as CVCV, where C is a consonant and V is a vowel or a variation, such as CCV, VCV, CVV, CVC, VC or VV.

The present invention utilizes the Official System of Romaji notation, with some exceptions, and the observation that many characters are compounds of two syllables to produce a simplified keyboard for the entry of Japanese language text utilizing Romaji characters notation.

It is therefore an object of the present invention to provide a keyboard device for the efficient entering of Japanese language text utilizing Romaji character notation.

It is a further object of the present invention to provide a keyboard device that will allow multiple Romaji character input sufficient to produce the Romaji character representation of two Japanese language characters.

It is yet a further object of the present invention to provide a method for the controlling and ordering of the characters of the Japanese language, utilizing Romaji character notation such that input of Japanese is greatly simplified.

SUMMARY OF THE INVENTION

The present invention is a keyboard device for entering Japanese language text utilizing Romaji character notation and a method of entering the Romaji character notation.

The keyboard device comprises: (a) a first set of two keyboards capable of being activated simultaneously and conformable to a human hand having five digits, first keyboard of the first set in a generally horizontal position having a plurality of keys receivable to finger digits of the human hand, the keys arranged in at least two rows, the rows containing Romaji consonants and punctuation characters and the second keyboard of the first set having a plurality of keys receivable to a thumb digit of the human hand, the keys arranged in at least one row, the row containing Romaji vowel characters, said at least one row being substantially perpendicular to said at least two rows of the first keyboard; and (b) a second set of two keyboards, the two keyboards of the second set being a generally mirror image of the two keyboards of the first set.

BRIEF DESCRIPTION OF THE DRAWINGS

FIG. 3 illustrates KANJI.

FIG. 4 illustrates HIRAGANA.

FIG. 5 illustrates KATAKANA.

DETAILED DESCRIPTION

The keyboard device of the present invention consists of two sets of keyboards, each set having two keyboards for a total of four keyboards. Each set is generally a mirror image of the other set.

Figure 1:
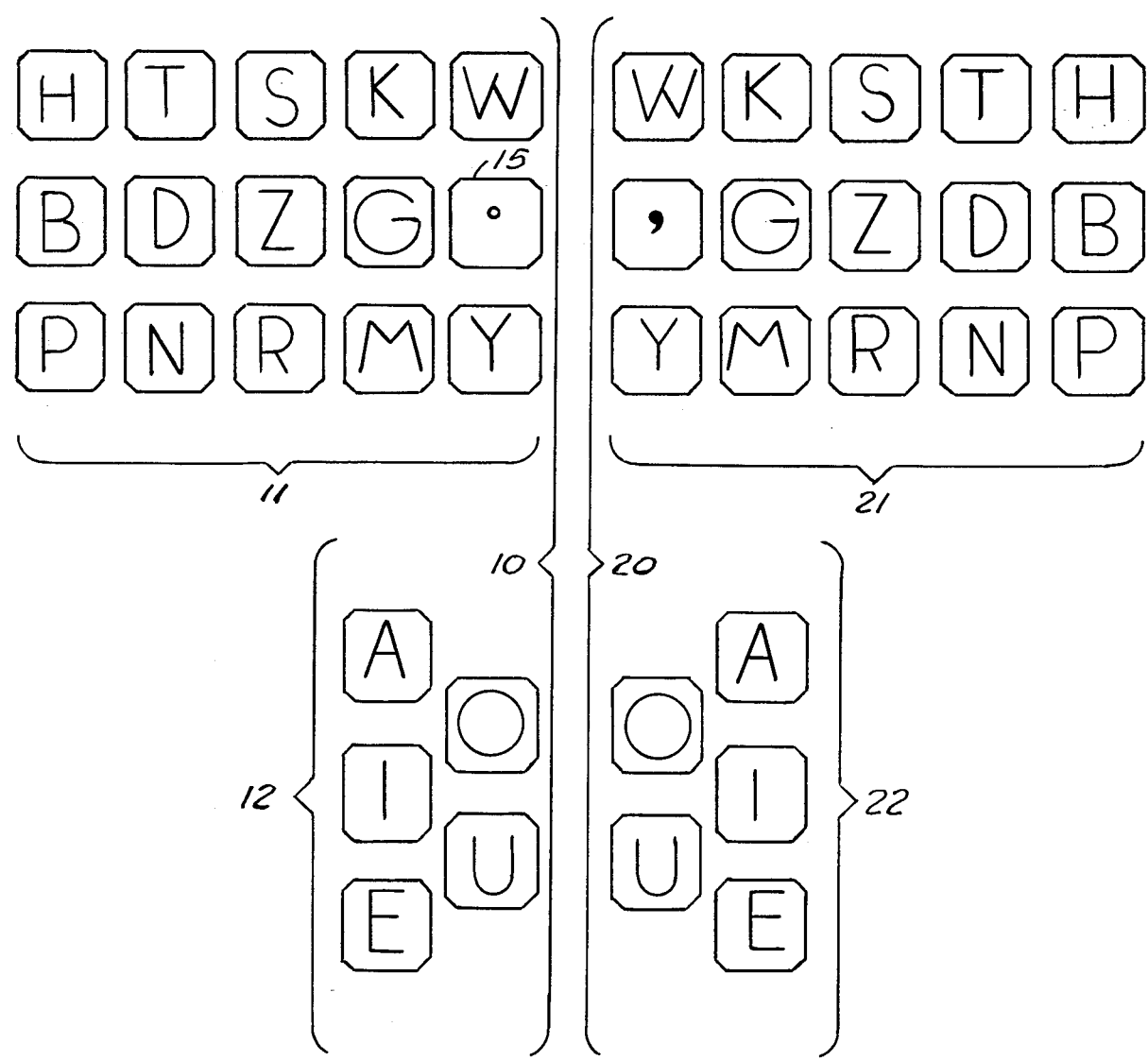
FIG. 1 illustrates one embodiment of a keyboard device of the present invention.

In FIG. 1, it can be seen that the first set, 10, comprises a consonant keyboard, [$C_1$], 11, and a vowel keyboard, [$V_1$], 12, the first set being generally a mirror image of the second set, 20, having a consonant keyboard, [$C_2$], 21, and a vowel keyboard, [$V_2$], 22. The only difference is that while one consonant keyboard contains a period [.], the other consonant keyboard contains a comma [,].

The term period as used in the present application also includes the Japanese style end-of-text character which is similar in function to a period [.], but depicted generally as a period with a center hole. FIG. 1 keyboard device contains a key (15) illustrating this period with a center hole mark.

Figure 2:
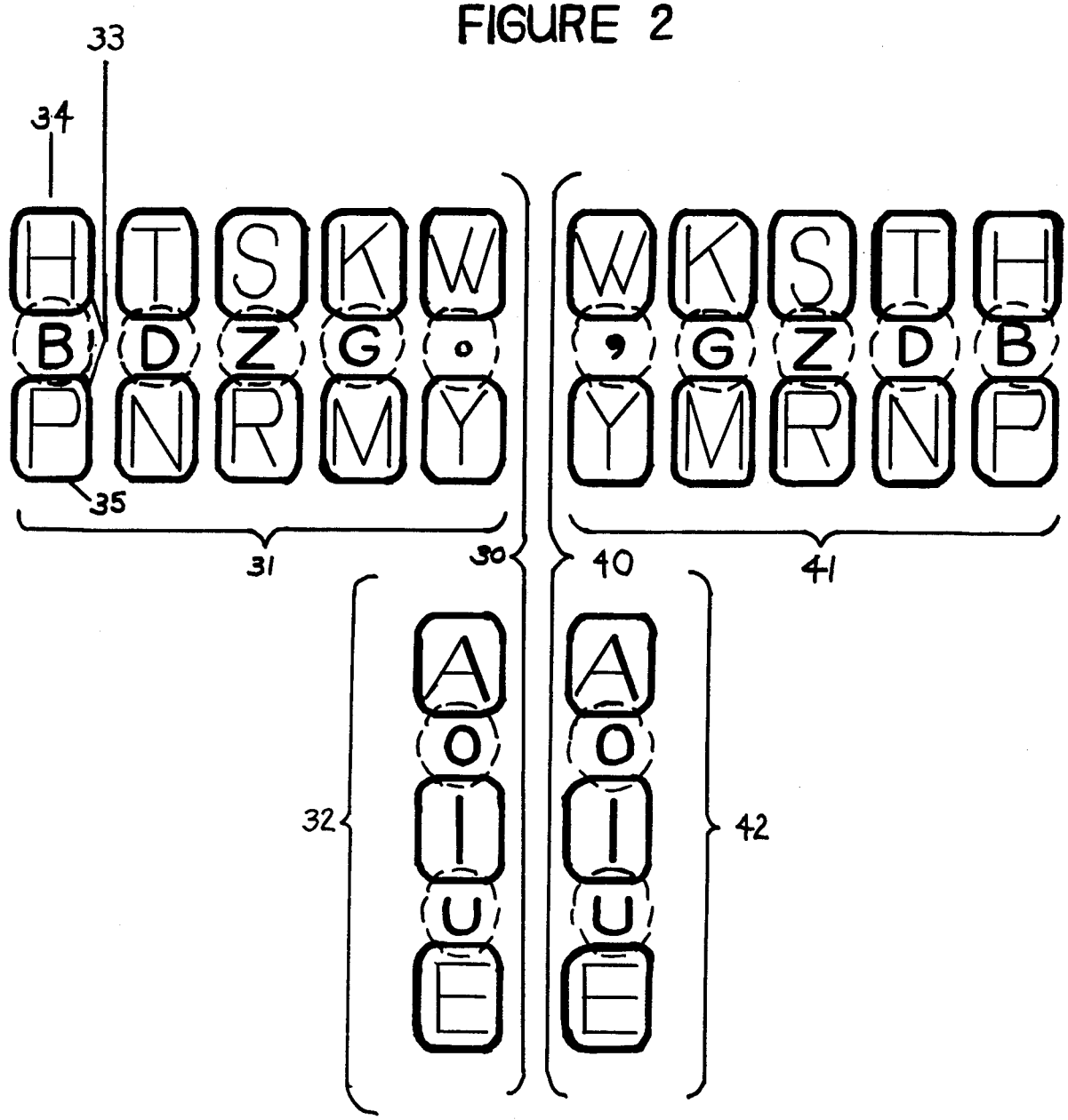
FIG. 2 illustrates a second embodiment of a keyboard device of the present invention.

FIG. 2 is a second embodiment of the keyboard device. The difference is that in FIG. 2, characters not present in FIG. 1, as separate keys, such as B, are produced by "hitting the crack", 33, between the H, 34, and P, 35, keys, thus pressing the H and P keys simultaneously. This will be interpreted as the letter B, and so on for other characters not present in FIG. 2. In FIG. 2, the sets of keyboards are mirror images of each other.

The consonants which must be present, either as separate keys or combinations of keys on each consonant keyboard, are H, T, S, K, W, B, D, Z, G, P, N, R, M and Y. One consonant keyboard may contain a period and the other consonant keyboard a comma. The vowel keyboards in either embodiment are mirror images of each other.

By chord stroking, which includes hitting the crack, in FIG. 2, a series of characters on one or both sets of keyboards, a string of characters is produced. The string is Romaji character notation of Japanese language text. The string may be placed on paper, magnetic or other type storage devices or used directly as input to a computer program for translation or other purposes.

There are three major classes of characters in Japanese language texts. The first class is KANJI, or Chinese ideographic characters. The Japanese phonetic characters are KANA. KANA has two syllabaries, HIRAGANA and KATAKANA. These two syllabaries, HIRAGANA and KATAKANA are the second and third classes of characters, respectively. HIRAGANA, the second class, are phonetic characters in the cursive style, used principally for native words and word endings. KATAKANA are phonetic characters in angular style, used chiefly for transliterating foreign words.

However, Arabic numerals, Roman alphabets, a variety of punctuation marks and other symbols are all used frequently and freely in Japanese text.

The present invention allows an operator to enter the Japanese language text, using Romaji character notation, while uniquely distinguishing the three classes of characters by utilizing a combination of keys or chord stroking. The presence, in the Japanese language text, of numerous sets of dual syllable characters, render as the present invention uniquely suited for use in conjunction with the Japanese language.

Utilizing the keyboard device of the present invention keystroking for the various character modes will be illustrated.

The keyboard device has two sets of keyboards, each set having a consonant keyboard and a vowel keyboard. The keyboards of the first set, $S_1$, will be designated $C_1$ and $V_1$, for the consonant keyboard and vowel keyboard respectively. The second set, $S_2$, of keyboards will be designated $C_2$ and $V_2$.

The period will be fixed on $C_1$ for this discussion and the comma on $C_2$, although these characters could be interchanged.

KANJI MODE

Using the keyboard device of the present invention, the input method of KANJI words and phrases will now be described.

The basic rule of KANJI input is that at least one key from each set, $S_1$ and $S_2$, is to be operated simultaneously creating a string of characters. The next stroke creates another line and so on.

Most commonly KANJI consists of two sysllables. This is represented by [consonant+vowel]+[consonant+vowel], or a keystroke [$C_1V_1$][$C_2V_2$]. Here all four keyboards are being activated simultaneously, by depressing one or more keys on each of the four keyboards.

Variations of this include: [$C_1V_1$][$C_2$]; [$C_1V_1$][$V_2$]; [$V_1$][$C_2V_2$]; [$V_1$][$C_2$] and [$V_1$][$V_2$]. All of these combinations, keystroked simultaneously will be interpreted as KANJI.

As the variations show, it is not necessary that both keyboards in each set of keyboards be activated.

If the KANJI is a single syllable, the comma, on keyboard $C_2$ will be used simultaneously with the single syllable. Variations include: [$C_1V_1$][,], or [$V_1$][,] for a single vowel.

Many Kanji characters have more than two syllables. In such cases, all successive syllables greater than two are entered on the second set of keyboards until all syllables are accounted for. An example of this pattern is [C₁V₁][C₂V₂] (first stroke), [C₂V₂] (second stroke), [C₂V₂] (third stroke). This would correspond to a 4 syllable Kanji character.

Figures 3, 4, 5:
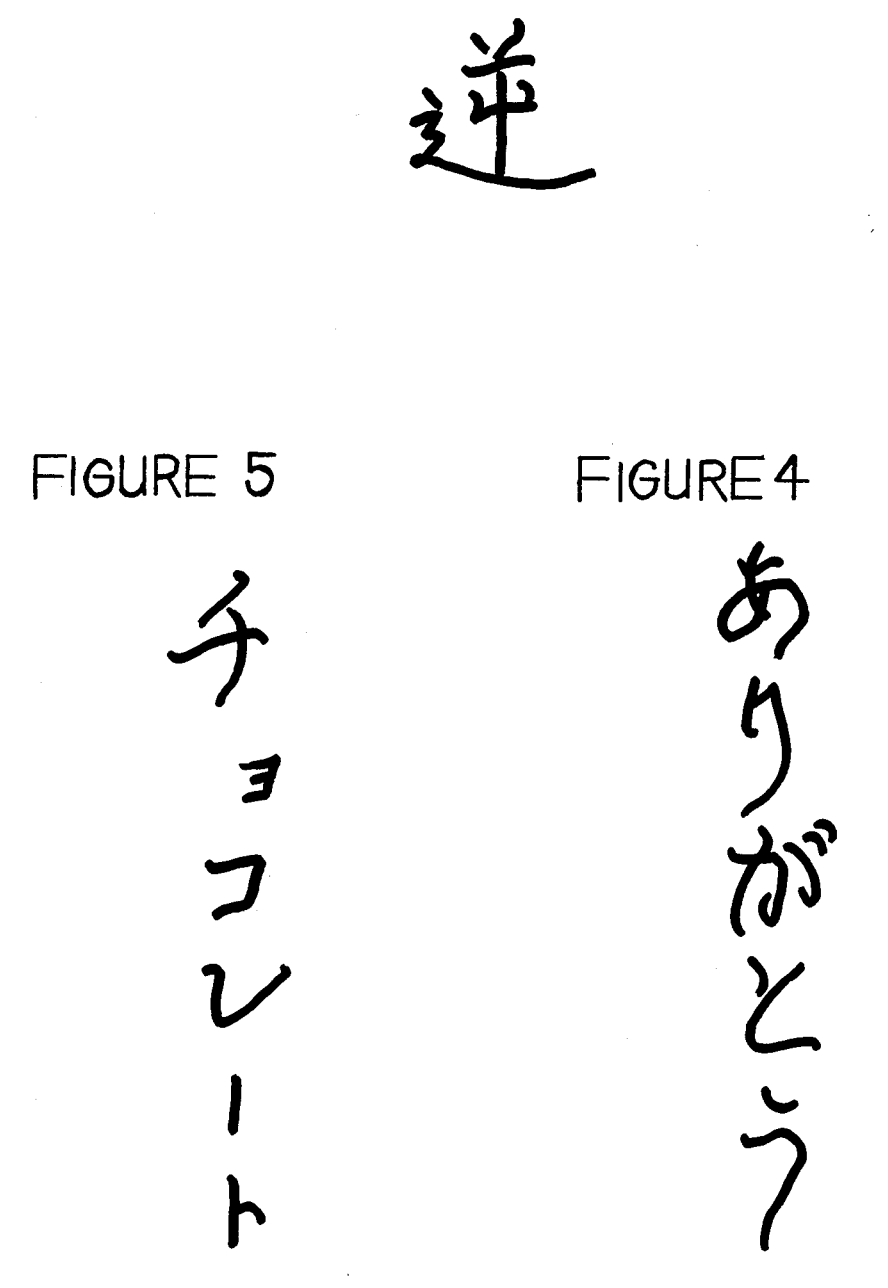

TABLE III illustrates Japanese language text utilizing Romaji character notation and the stroking patterns associated with the Romaji character notation. FIG. 3 illustrates KANJI representation of Example 1, Table III.

TABLE III

KANJI EXAMPLES

| EXAMPLE | STROKE | KEYBOARDS | | ROMAJI | | ENGLISH TRANSLATION |
|---|---|---|---|---|---|---|
| 1. | 1 | [C₁V₁] | [C₂V₂] | [GYA] | [KU] | Reverse |
| 2. | 1 | [C₁V₁] | [C₂] | [KE] | [N] | Sword |
| 3. | 1 | [C₁V₁] | [V₂] | [KA] | [I] | Sea |
| 4. | 1 | [V₁] | [C₂V₂] | [A] | [KI] | Autumn |
| 5. | 1 | [V₁] | [C₂] | [E] | [N] | Circle |
| 6. | 1 | [V₁] | [V₂] | [A] | [I] | Love |
| 7. | 1 | [C₁V₁] | [C₂V₂] | [KE] | [MU] | Smoke |
|  | 2 |  | [C₂V₂] |  | [RI] |  |
| 8. | 1 | [C₁V₁] | [C₂V₂] | [KU] | [TI] | Lips |
|  | 2 |  | [C₂V₂] |  | [BI] |  |
|  | 3 |  | [C₂V₂] |  | [RU] |  |
| 9. | 1 | [C₁V₁] | [,] | [HA] | [,] | Leaf |
| 10. | 1 | [V₁] | [,] | [E] | [,] | Picture |

HIRAGANA MODE

The entry of the second class of symbols, or HIRAGANA, will now be described.

HIRAGANA will be entered only on the first set of keyboards. Variations of this include [C₁V₁], [V₁] and [C₁]. If a second syllable follows a first syllable use a second keystroke on the same first set of keyboards. In case of a double consonant, for example tt, the second consonant will be produced by a second keystroke on the same first set of keyboards. If a long vowel is necessary the pattern period-vowel, [.V₁], may be used.

TABLE IV illustrates Romaji character input for HIRAGANA.

The entry of the third class of symbols, or KATAKANA will now be described. FIG. 4 illustrates HIRAGANA representation of Example 1, Table IV.

TABLE IV

HIRAGANA EXAMPLES

| EXAMPLE | STROKE | KEYBOARD | ROMAJI | ENGLISH TRANSLATION |
|---|---|---|---|---|
| 1. | 1 | [V₁] | [A] | Thanks |
|  | 2 | [C₁V₁] | [RI] |  |
|  | 3 | [C₁V₁] | [GA] |  |
|  | 4 | [C₁V₁] | [. TO] |  |
| 2. | 1 | [V₁] | [A] | Thanks |
|  | 2 | [C₁V₁] | [RI] |  |
|  | 3 | [C₁V₁] | [GA] |  |
|  | 4 | [C₁V₁] | [TO] |  |
|  | 5 | [V₁] | [U] |  |
|  | (Same as 1, except long vowel symbol avoided) | | | |
| 3. | 1 | [C₁V₁] | [SI] | Oops! |
|  | 2 | [C₁V₁] | [MA] |  |
|  | 3 | [C₁] | [T] |  |
|  | 4 | [C₁V₁] | [TA] |  |
| 4. | 1 | [C₁V₁] | [SI] | I've got it! |
|  | 2 | [C₁V₁] | [ME] |  |
|  | 3 | [C₁V₁] | [TA] |  |
|  | 4 | [C₁V₁] | [ZO] |  |

KATAKANA MODE

KATAKANA will be entered only on the second set of keyboards. Each will be entered preceded with a delimiter, for example, the period [.]. Variations of entry are thus [.][C₂V₂], [.][V₂], [.][C₂].

The long vowel in KATAKANA is usually expressed by a KANA followed by a vertical or horizontal bar. On the keyboard device of the present invention, the vowel will be followed by a comma. So, a single long vowel is represented by the sequence [.][V₂,], where the period is located on the consonant keyboard, C₁, of the first set of keyboards, V₂ is located on the vowel keyboard of the second set of keyboards and , (comma) is located on the consonant keyboard, C₂, of the second set of keyboards. Any or all of these symbols maybe activated by actual pressing of the key or by keystroking at least two keys in a chord stroke, where the chord combination represents the symbol.

TABLE V illustrates Romaji character input for KATAKANA. FIG. 5 illustrates KATAKANA representation of Example 1, Table V.

TABLE V

KATAKANA EXAMPLES

| EXAMPLE | STROKE | KEYBOARD | | ROMAJI | | ENGLISH TRANSLATION |
|---|---|---|---|---|---|---|
| 1. | 1 | [C₁] | [C₂V₂] | [.] | [TYO] | Chocolate |
|  | 2 | [C₁] | [C₂V₂] | [.] | [KO] |  |
|  | 3 | [C₁] | [C₂V₂] | [.] | [RE,] |  |
|  | 4 | [C₁] | [C₂V₂] | [.] | [TO] |  |

TABLE V-continued

| EXAMPLE | STROKE | KATAKANA EXAMPLES KEYBOARD | ROMAJI | ENGLISH TRANSLATION |
|---|---|---|---|---|
| 2. | 1 | $[C_1][V_2]$ | [.] [A] | America |
|  | 2 | $[C_1][C_2V_2]$ | [.] [ME] |  |
|  | 3 | $[C_1][C_2V_2]$ | [.] [RI] |  |
|  | 4 | $[C_1][C_2V_2]$ | [.] [KA] |  |

ENGLISH ALPHABET MODE

An English alphabet can be produced by the consonant keyboard of one set of keyboards. For those letters not represent on the consonant keyboard, a delimiter, for example the comma and the consonant keyboard of the other set of keyboards, not having a comma on the consonant keyboard.

Addition of one extra key to each set of keyboards would allow the ability to differentiate between upper and lower case characters. This extra key could physically be an extra key or the extra key could be another character or delimiter to indicate upper or lower case.

TABLE VI illustrates a possible English alphabet pattern.

TABLE VI

| ENGLISH LETTERS | KEYBOARDS | CHARACTERS | OPTIONAL ADDITIONAL CASE KEY |
|---|---|---|---|
| A | $[C_1][C_2]$ | [M] [,] | $C_2$ |
| B | $[C_2]$ | [B] | $C_1$ |
| C | $[C_1][C_2]$ | [G] [,] | $C_2$ |
| D | $[C_2]$ | [D] | $C_1$ |
| E | $[C_1][C_2]$ | [K] [,] | $C_1$ |
| F | $[C_1][C_2]$ | [D] [,] | $C_2$ |
| G | $[C_2]$ | [G] | $C_1$ |
| H | $[C_2]$ | [H] | $C_1$ |
| I | $[C_1][C_2]$ | [S] [,] | $C_2$ |
| J | $[C_1][C_2]$ | [Z] [,] | $C_2$ |
| K | $[C_2]$ | [K] | $C_1$ |
| L | $[C_1][C_2]$ | [R] [,] | $C_2$ |
| M | $[C_2]$ | [M] | $C_1$ |
| N | $[C_2]$ | [N] | $C_1$ |
| O | $[C_1][C_2]$ | [T] [,] | $C_2$ |
| P | $[C_2]$ | [P] | $C_1$ |
| Q | $[C_1][C_2]$ | [P] [,] | $C_1$ |
| R | $[C_2]$ | [R] | $C_1$ |
| S | $[C_2]$ | [S] | $C_1$ |
| T | $[C_2]$ | [T] | $C_1$ |
| U | $[C_2]$ | [H] [,] | $C_2$ |
| V | $[C_1][C_2]$ | [B] [,] | $C_2$ |
| W | $[C_2]$ | [W] | $C_1$ |
| X | $[C_1][C_2]$ | [N] [,] | $C_2$ |
| Y | $[C_2]$ | [Y] | $C_1$ |
| Z | $[C_2]$ | [Z] | $C_1$ |

ARABIC NUMERAL MODE

Generation of Arabic numerals, using the two consonant keyboards for example, is illustrated in TABLE VII.

TABLE VII

| NUMERALS | KEYBOARDS | CHARACTERS |
|---|---|---|
| 1 | $[C_1][C_2]$ | [H] [Y] |
| 2 | $[C_1][C_2]$ | [T] [Y] |
| 3 | $[C_1][C_2]$ | [S] [Y] |
| 4 | $[C_1][C_2]$ | [K] [Y] |
| 5 | $[C_1][C_2]$ | [W] [Y] |
| 6 | $[C_1][C_2]$ | [Y] [W] |
| 7 | $[C_1][C_2]$ | [Y] [K] |
| 8 | $[C_1][C_2]$ | [Y] [S] |
| 9 | $[C_1][C_2]$ | [Y] [T] |
| 0 | $[C_1][C_2]$ | [Y] [H] |

OTHER MODES

Punctuations and any other necessary symbols can be defined as necessary by various vowel, consonant, period and comma combinations.

Two special cases of Romaji syllabication ambiguity are resolved by the method of the present invention.

For example GENIN, can be GE/NIN meaning servant or GEN/IN meaning cause. The former can be entered as first stroke [GE][,], $[C_1V_1][C_2]$, and second stroke [NI][N]$[C_1V_1][C_2]$. The latter can be entered as [GE][N]$[C_1V_1][C_2]$ on the first stroke and [I][N], $[V_1][C_2]$ on the second stroke.

A second problem occurs occassionally when KANJI are combined. The original individual pronunciations of each KANJI are often changed.

For example NICHI and HON, when combined, can be NIPPON or NIHON. The method of the present invention easily accomodates this problem. NIPPON is first stroke [NI][P], ($[C_1V_1][C_2]$) and second stroke, [PO][N] ($[C_1V_1][C_2]$). NIHON is [NI][,] ($[C_1V_1][C_2]$), first stroke, and on the second stroke [HO][N] ($[C_1V_1][C_2]$).

Another possible use for the keyboard device of the present invention is for those people who are sight deficient. With a small amount of practice, and the reduced number of keys in the present invention, the sight deficient could produce, utilizing the present keyboard device, electrical impulses, written materials or tactually legible materials.

Although specific embodiments of the present invention have been shown and described, it is to be understood that various modifications may be made without departing from the spirit or exceeding the scope of the claimed invention.

I claim:

1. A keyboard device for entering Japanese language text utilizing Romaji character notation comprising:
   (a) a first set of two keyboards capable of being activated simultaneously and comfortable to a human hand having five digits, the first keyboard of the first set in a generally horizontal position having a plurality of keys receivable to four finger digits of the human hand, the keys arranged in at least two rows, the rows containing Romaji consonants and punctuation characters and the second keyboard of the first set having a plurality of keys receivable to a thumb digit of the human hand, the keys arranged in at least one row, the row contaning Romaji vowel characters, said at least one row being substantially perpendicular to said at least two rows of the first keyboard; and
   (b) a second set of two keyboards, the two keyboards of the second set being a generally mirror image of the two keyboards of the first set.

2. A keyboard device as recited in claim 1, further comprising:

(c) a means for converting Romaji character notation keystrokes into characters of the Japanese language.

3. A keyboard device as recited in claim 1, wherein the first keyboard of the first set of keyboards comprises two rows of five characters each, one row containing the characters H, T, S, K, and W, the second row containing the characters P, H, R, M, and Y, the second keyboard of the first set of keyboards comprises one row containing the characters A, I and E and the second set of keyboards being a mirror image of the first set of keyboards.

4. A keyboard device as recited in claim 1, wherein the first keyboard of the first set of keyboards comprises three rows of five characters each, a first row containing the characters H, T, S, K, and W, a second row containing the characters B, D, Z, G and . (period), the third row containing the characters P, N, R, M, and Y, the second keyboard of the first set of keyboards comprises two rows, the first row containing the characters A, I, and E, the second row containing the characters O and U and said second set of keyboards being a mirror image of the first set of keyboards, except the . (period) is a , (comma).

5. A keyboard device as recited in claim 1, wherein a combination of Romaji characters represent a character not present as a separate key on the keyboards of the first or second set of keyboards.

* * * * *